United States Patent [19]
Durling

[11] 3,909,069
[45] Sept. 30, 1975

[54] AIR CONTROL VALVE FOR A PNEUMATIC BRAKE SYSTEM

[75] Inventor: Harold Durling, Elsie, Mich.

[73] Assignee: Midland-Ross Corporation, Cleveland, Ohio

[22] Filed: Dec. 11, 1974

[21] Appl. No.: 531,644

Related U.S. Application Data
[62] Division of Ser. No. 449,707, March 11, 1974.

[52] U.S. Cl. .................................... 303/9; 303/64
[51] Int. Cl.² ........................................ B60T 15/48
[58] Field of Search ............ 188/170; 303/9, 52, 46, 303/63, 64, 70, 71

[56] References Cited
UNITED STATES PATENTS

| | | | |
|---|---|---|---|
| 3,285,672 | 11/1966 | Avrea | 303/71 X |
| 3,294,455 | 12/1966 | Valentine | 303/63 X |
| 3,666,324 | 5/1972 | Page et al. | 303/9 |

*Primary Examiner*—Duane A. Reger
*Attorney, Agent, or Firm*—Frank J. Nawalanic

[57] ABSTRACT

A failsafe, foolproof control valve for a tractor-trailer air brake system which, among its other features, permits the tractor brakes to remain in a parked position while the trailer system is being pressurized. The control valve includes four ports, two of which communicate with a first valve chamber and the other two communicate with a second valve chamber. A spring biased first plunger is disposed within the first chamber and a manually operable second plunger extends within the second chamber. Movement of the second plunger establishes several operating modes of the valve to provide various fluid flow paths between the ports in a predetermined manner. At least one of these modes automatically repositions the second plunger to its normal operating mode after the trailer system has been optionally pressurized by actuation of a conventional park valve.

8 Claims, 6 Drawing Figures

U.S. Patent   Sept. 30,1975   Sheet 2 of 3   3,909,069

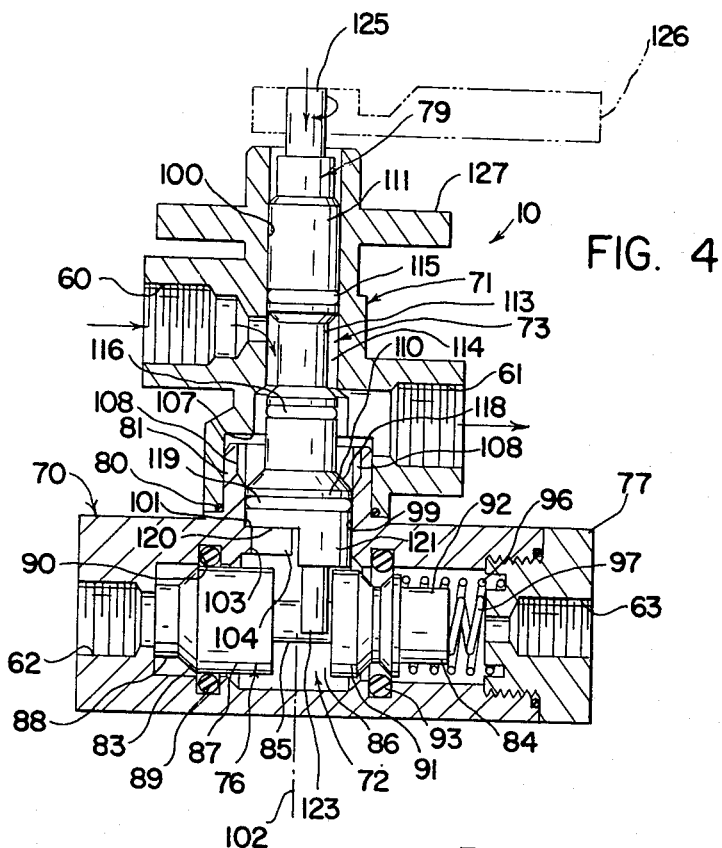
FIG. 4
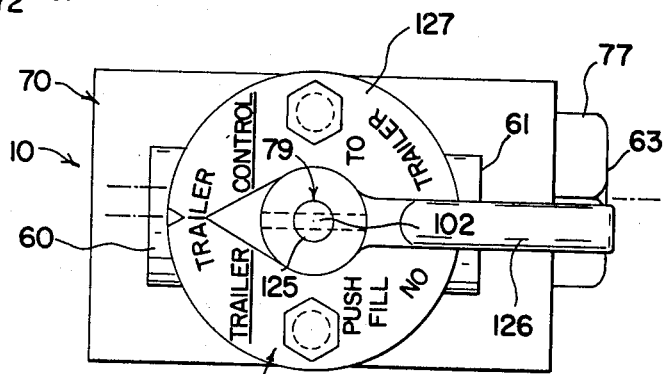
FIG. 5
FIG. 6
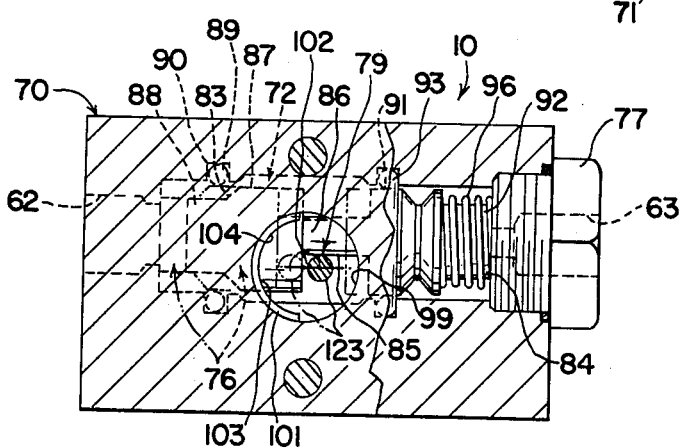

AIR CONTROL VALVE FOR A PNEUMATIC BRAKE SYSTEM

This is a division of application Ser. No. 449,707, filed Mar. 11, 1974.

This invention relates generally to a pneumatic vehicle brake system and more particularly to a control valve which regulates various operating modes of the brake system.

The invention is particularly applicable to a truck tractor equipped with spring-set actuators and operated either coupled to or uncoupled from a trailer. However, it will be appreciated to those skilled in the art that the invention may have broader applications and in particular is applicable to tractor brake systems which do not employ spring-set actuators.

Heretofore, truck tractors commonly employed a manually operable park valve which was actuable in an applied position to vent the tractor brakes and in a released position to re-establish appropriate fluid communication to permit normal brake operation. Generally, there were no provisions for setting the trailer brakes with the same control. Air supplied to the trailer passed through a tractor protector valve which was automatically actuated when a loss of air pressure occurred in the trailer system to prevent fluid communication between the tractor and trailer brake systems. Such valves were equipped with a manual lock to permit operation of the tractor when not coupled to a trailer in the bobtail mode. Recent federal safety regulations now require the tractor be equipped with only one valve which will simultaneously release and apply the parking brakes for both tractor and trailer. Modifications to existing tractor systems to comply with this regulation have been to insert the tractor protector valve in series with the park control valve. When the park control valve is applied, supply line pressure is vented and both tractor and trailer brakes are set in a park position. However, when the park control valve is placed in its released position to resupply fluid pressure, the tractor protector valve would have to be manually reset. Because this would not satisfy the regulations, it has been known to apply a valve with a tractor protector valve which prevents same from automatically closing when supply line pressure is vented therethrough yet permits the valve to function normally during highway operation. One significant disadvantage of this arrangement is that the tractor and trailer systems can only be pressurized simultaneously. Thus the trailer system could not be supplied with a source of compressed air unless the tractor brakes were released. This made it impractical to operate pneumatic trailer attachments such as lifts with the rigs parked as, for example, on an incline.

Another approach which permitted a source of air to be supplied to the trailer while the tractor brakes remain set was a relatively expensive three-valve panel cluster which required substantial modification to existing systems to be applied thereto. This valve cluster had a first valve for simultaneously applying and releasing the park brakes of both tractor and trailer to comply with the regulations. A second valve permitted only the tractor brakes to be applied thereby permitting the trailer system to be filled for operation of the pneumatic trailer attachments. A third valve was provided to manually shut off the air supply to the trailer for bobtail operation and incorporated an automatic feature to close off the trailer air supply in event of a breakaway. Unfortunately, the third valve also controlled the setting of the trailer brakes with the result that the arrangement could not be considered "foolproof" in that the operator could apply the wrong valve in certain driving situations which could cause trailer jackknifing, etc.

It is thus an object of the subject invention to provide a failsafe, foolproof control valve in an air brake system which, among other features, provides a supply of compressed air to a trailer coupled to a tractor while the tractor brakes remain in a parked position.

This object along with other features of the subject invention is achieved by means of an air control valve applied in a conventional air brake system of a tractor. The tractor brake system may be defined as including a conventional source of compressed air, spring-set rear service brake actuators on a tractor, conventional coupling means whereby the tractor may be operated connected to or disconnected from a trailer and a conventional park control valve. The park valve is connected in the usual manner with its inlet in fluid communication with a source of compressed air, an outlet connected to the brake actuators and a vent and is manually operable from a released position communicating the inlet with the outlet to an applied position communicating the outlet with the vent whereby the brake actuators are set in a parked position.

The control valve supplied with the system has a first port in constant fluid communication with the source of compressed air, a second port in fluid communication with the trailer coupling means, a third port in fluid communication with the outlet of the park control valve and a fourth port vented to atmosphere. Fluid communication between the various ports is controlled by a manually actuated second plunger and a pressure sensitive first plunger disposed within the valve. In the valve's normal operating mode which occurs with the park control valve in a released position, the third port is communicated with the second port. When the park valve is applied, the control valve automatically cycles to its park mode where the trailer system is vented to apply the trailer brakes by movement of the first plunger which communicates the second and fourth ports with one another. When it is desired to pressurize the trailer system or operate air driven trailer accessories with the tractor in its parked position and with tractor brakes set, the second plunger of the control valve is manually depressed to its fill mode position to establish fluid communication between the first and second ports. When the rig is desired to be driven in normal operation, movement of the park control valve to its released position automatically recycles the control valve to its normal operating mode. Alternatively, the rig could be moved from its parked position by release of the park valve without the control valve being first placed in its fill mode to satisfy federal regulations.

In accordance with another feature of the subject invention, the control valve could be applied in "new" systems to obviate the need of a tractor protector control valve. This results because the control valve is designed to function automatically in a failsafe mode and in a manually locked bobtail mode. In the event of trailer system pressure loss, the valve automatically moves to a failsafe mode by first plunger movement which vents the second port to atmosphere via the fourth port and prevents fluid communication between the first and/or third port with the second port. The tractor air system is also completely protected when the tractor is driven not coupled to the trailer by rotation of the second plunger to a locked bobtail mode which vents the second port to atmosphere through the fourth port and prevents fluid communication between the first and/or third port with either the second or fourth port.

It is thus another object of the subject invention to provide an air control valve for use in a pneumatic brake system which provides various fluid communications in accordance with a normal operating mode, a fill mode, a bobtail mode and a failsafe mode of valve operation.

Another object of the subject invention is to provide an air control valve which may be easily incorporated in known tractor air brake systems for governing in a predetermined manner certain functions of such systems.

Yet another object of the subject invention is to provide a control valve in conventional tractor brake systems which obviates the need for tractor protector control valves conventionally associated with such systems.

Yet another object of the subject invention is to provide a four-port valve having two plungers operatively associated with one another whereby axial movements of one plunger relative the other establishes various flow paths through the valve and rotational movement of one plunger results in axial movement of the other to a locked position.

The invention may take physical form in certain parts and arrangement of parts, a preferred embodiment of which will be described in detail herein and illustrated in the accompanying drawings which will form a part hereof and wherein:

FIGS. 2, 3 and 4 are sectional elevation views of the valve in various operating modes;

FIG. 5 is a cross-sectional view of the valve taken along line 5—5 of FIG. 2; and FIG. 6 is a top view of the control valve showing the manually operable positions of the valve.

Figure 1:
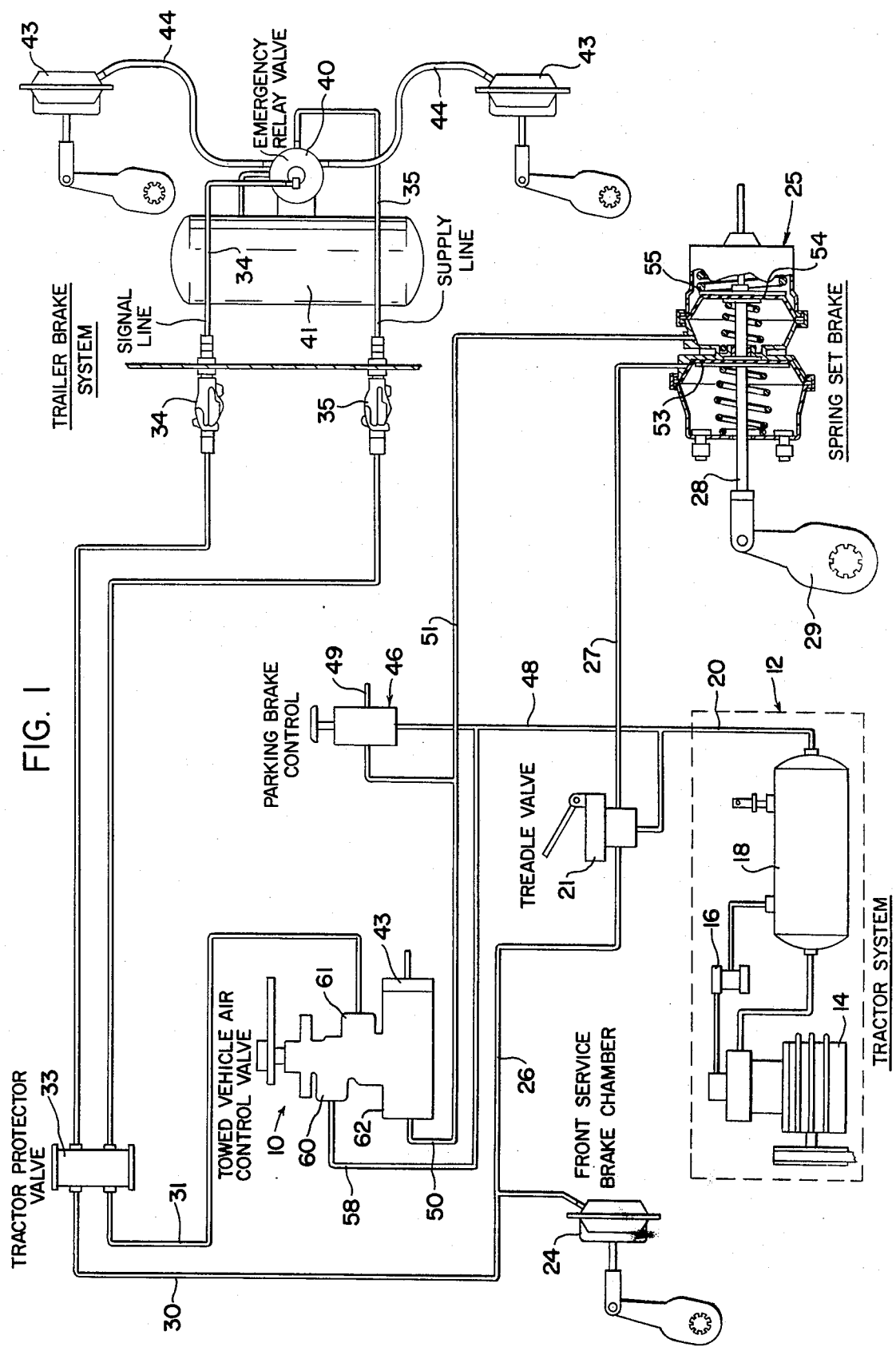
FIG. 1 is a schematic illustration of a typical air brake system employing the control valve of the subject invention.

Referring now to the drawings wherein the showings are for the purpose of illustrating a preferred embodiment of the invention only and not for the purpose of limiting same, FIG. 1 is a general arrangement of a vehicle braking system which more specifically includes a truck tractor brake system operable either coupled to or uncoupled from a trailer brake system. Included in the tractor brake system is an air control valve 10 of the subject invention. With the exception of air control valve 10, the component parts shown in FIG. 1 and the overall system functions, except as controlled by valve 10, are conventional. Thus the control valve of the subject invention may best be explained by first having reference to the conventional components of the system which will not be described in detail herein.

The conventional aspects of the system thus shown in FIG. 1 include a source of compressed air supplied by the components shown within dotted enclosure 12. Such components include, generally speaking, a compressor 14 driven by the tractor engine to supply air at a given pressure controlled by governor 16 into a reservoir arrangement 18. Reservoir 18 is capable of maintaining air supplies at supply or emergency pressure for brake system purposes which are associated with such terms as known in the art. An outlet line 20 from the reservoir 18 communicates with a known treadle valve 21. Depressing treadle 21 varying degrees admits air at corresponding pressures into the service brake chambers of front brake actuators 24 and rear spring-set brake actuators 25 via lines 26, 27 respectively and release of the treadle permits air flow to reverse its direction and vent through treadle valve 21. When the brake chambers are pressurized, an actuator plunger rod 28 is moved to actuate slack adjuster mechanisms 29 to apply the brakes during normal operating modes of the tractor. In communication with line 26, as by a suitable T-connection, is an operating or signal line 30 which, along with an emergency or supply line 31, is connected to a customary tractor protector valve 33. Protector valve 33 consists of a usual spool-shuttle plunger which is raised by air pressure in supply line 31 to permit flow through line 30 of the valve and which drops to prevent flow if supply pressure falls below a predetermined value. Downstream of protector valve 33 signal and supply lines 30, 31 are provided with suitable connections 34, 35 respectively or coupling means for trailer operation.

When the tractor and trailer connections 34, 35 are coupled, the trailer brake system becomes part of the overall brake system. Most current trailer brake systems employ some form of emergency relay valve 40 which is operable to set the trailer brakes when supply line pressure drops below a predetermined value and return the brakes to normal operating mode when supply pressure is restored. The conventional trailer system illustrated in FIG. 1 includes an emergency relay valve 40 which is connected to signal and supply lines 30, 31, a reservoir 41 and trailer brake actuators 43 through suitable lines 44. Trailer brake actuators 43 are shown to be of the single diaphragm, air applied-spring released type although other brake actuators may be applied to the trailer system if slight changes, known to those skilled in the art, be made in the fluid communication lines. Independent of the brake actuators employed, emergency relay valve 40 functions in the usual manner to admit reservoir pressure to brake actuators 43 when treadle valve 21 is depressed and vent same when the treadle is released. Similarly in the event of a predetermined pressure drop in supply line 31, relay valve 40 is actuated to supply air at system pressure from reservoir 41 to trailer brake actuators 43 to set the brakes. When supply pressure is restored in line 31, relay valve 40 vents the air in the trailer brake actuators 43 to re-establish normal operating mode of the system.

Venting of supply line 31 to actuate the trailer brakes to a parked position is controlled by a park brake control valve 46 in the tractor cab. Park brake control 46 has an inlet connected by a suitable line 48 to the source of compressed air 12, a vent 49 and an outlet which is connected to a line 50 which in turn leads to one of the ports of the air control valve 10 of the subject invention. The outlet of the park brake control valve 46 is also connected by a line 51 to the rear spring-set brake actuator 25. The spring-set brake actuator 25 illustrated is of a known type having a first diaphragm 53 connected to treadle valve 21 through line 27 which is movable under pressure to set the brakes during normal operation of the tractor, and a second diaphragm 54 movable under pressure to maintain a powerful spring 55 in a compressed manner. Second diaphragm 54 is in fluid communication with line 51 and when park valve 46 is in its released position, air at supply line pressure is communicated from line 48 to line 51 to maintain spring 55 compressed. When park valve 46 is in its applied position, lines 50, 51 are vented to atmosphere by the park valve vent 49 and spring 55 in spring-set actuator 25 is released from its compressed position to axially move plunger rod 28 to set the rear brakes.

Having thus described the conventional aspects of the brake system illustrated, the structure and operation of air control valve 10 will now be described in detail. As shown in FIG. 1, the air control valve 10 has four ports which are physically connected within the above described system as follows:

1. A first port 60 on the inlet side of the valve communicates with the source of compressed air 12 upstream of park control valve 46 by a line 58 "T'd" to line 48. First port is thus connected to a source of compressed air at supply pressure.

2. A second port 61 on the outlet side of the valve communicates with supply line 31 which leads to tractor protector valve 33.

3. A third port 62 is connected downstream of park control valve 46 to the source of compressed air 12 at supply line pressure by line 50.

4. A fourth port 63 is vented to atmosphere.

Figure 2:
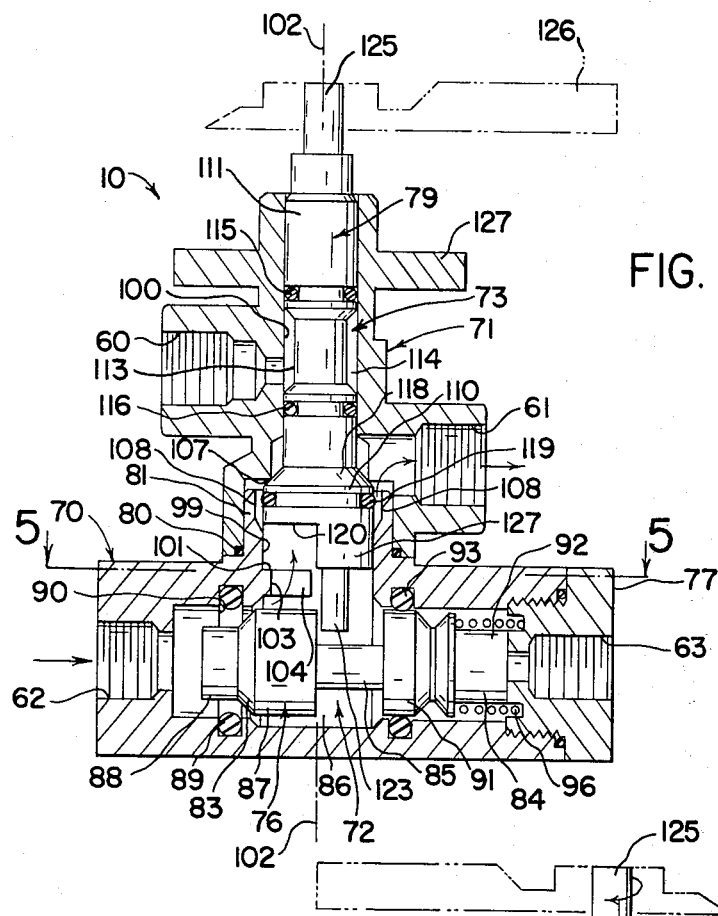

Referring now to FIG. 2, air control valve 10 may best be defined as having a first valve body portion 70 and a second valve body portion 71. Within first valve body portion 70 is a first valve chamber 72 in fluid communication with third and fourth ports 62, 63. Within second valve body portion 71 is a second valve chamber 73 in fluid communication with first and second ports 60, 61. Both valve chambers 72, 73 are in fluid communication and generally perpendicular to one another. It should be noted though that first chamber 72 is axially shifted from center with respect to second chamber 73 to minimize valve length as will be explained hereafter.

Slidingly and sealingly disposed within first valve chamber 72 is an axially extending first plunger 76. To permit assembly of first plunger 76 within first valve chamber 72, the fourth valve port 63 is shown as a cap or plug 77 threaded into first valve portion 70. Slidingly and sealingly disposed within second valve chamber 73 is a second plunger 79. To permit assembly of second plunger 79 within second chamber 73, valve body portions 70, 72 are formed from separate pieces which are suitably secured together by known means and sealed as at 80. For purposes of nomenclature and ease of explanation, the upwardly extending part 81 of first valve body portion 70 shown in FIG. 1 is defined to comprise a portion of second valve chamber 73.

Figure 3:
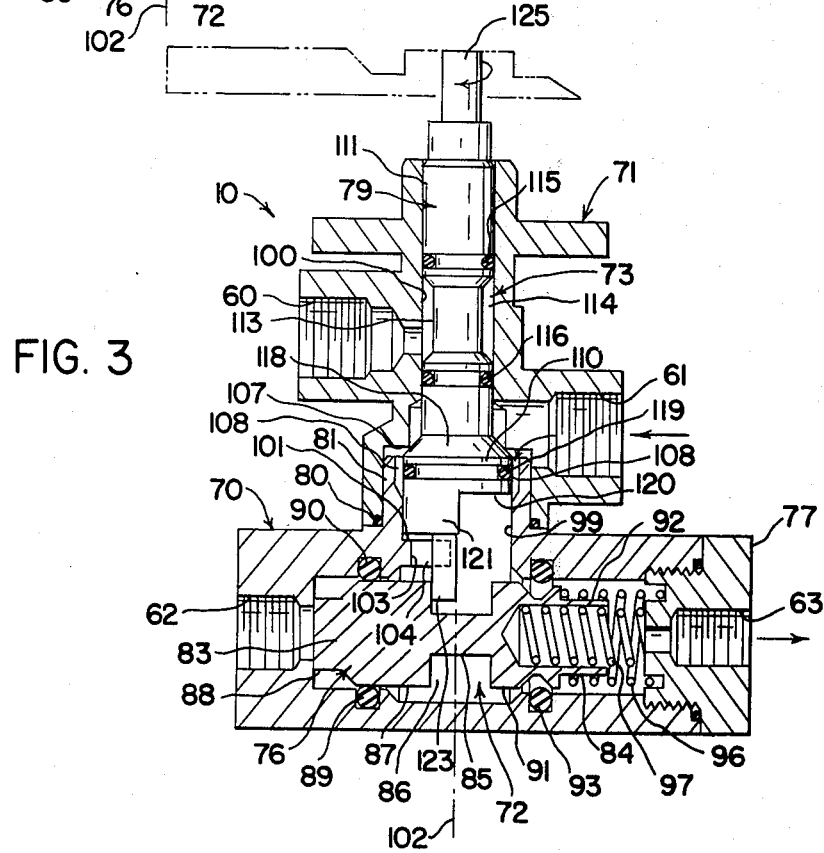

First plunger 76 has a first slider-piston 83 at one end thereof, a second slider-piston 84 at the opposite end and a relatively small interconnecting rod 85 joining slider-pistons 83, 84 together with a gap 86 therebetween. First slider-piston 83 is defined by a cylindrically shaped sliding portion 87 adjacent interconnecting rod 85 and a smaller cylindrical piston portion 88 extending from sliding portion 87. When first plunger 76 is axially moved to its first position as shown in FIGS. 3 and 4, first piston portion 88 abuts third port 62 and first sliding portion 87 is sealed and maintained in position by an O-ring 89 positioned within an annular groove 90 formed in first valve chamber 72. Similarly, second slider-piston 84 has a second sliding portion 91 and a second piston portion 92; second piston portion 92 abutting fourth port 63 and second sliding portion 91 sealingly engaged by a second O-ring seal 93 when first plunger 76 is in its second position as shown in FIG. 2. However, second slider-piston 84 has a V-shaped groove notched in its sliding portion 91 adjacent piston portion 92 to permit fluid flow around second slider-piston 84 when first plunger 76 is in its first position. First plunger 76 is normally biased towards its first position by spring means shown to include a first spring 96 mounted between plug 77 and second slider portion 91 and a second spring 97 compressed at one end by plug 77 and received within second piston portion 92 which is hollowed in a customary manner to seat spring 97 therein (see FIGS. 3,4).

Second valve chamber 73 is in fluid communication with first valve chamber 72 at its bottom end and is open at its top end and may properly be viewed as a stepped cylindrical bore having a first cavity 99 adjacent first chamber 72 which is larger in area than a second cavity 100 which is defined to include the open end of second valve chamber 73. First cavity 99 is especially configured and includes a shelf or a stop 101 which is physically located at the bottom of first cavity 99 to define a line of demarcation between the first and second valve chambers 72, 73. Shelf 101 may be viewed as being shaped as a half moon and extending within first cavity 99 to a distance not beyond the centerline 102 thereof. As best shown in FIG. 5, shelf 101 is in turn relieved as at 103 to define a half-moon shaped or other suitable open receiving area 104 for purposes to be explained hereafter. Shelf 101 may thus be viewed as a segmented ring extending from first cavity 99. Also extending with first cavity 99 adjacent second port 61 is a shoulder 107 which functions as a second stop for second plunger 79 and defines a line of demarcation between first and second cavities 99, 100. In between shoulder 107 and shelf 101 are a series of circumferentially spaced flutes 108 which are cut into first cavity 99, axially extend along the cavity a predetermined distance and are open at their upper ends to provide communication with second port 61.

Second plunger 79 which is disposed within second valve chamber 73 is similarly stepped in cylindrical configuration to define a first plunger portion 110 disposed within first cavity 99 and a smaller second plunger portion 111 disposed within second cavity 100. Second plunger portion 111 is recessed as at 113 to define a flow area 114 which is always in communication with first port 60. Flow area 114 is adapted to be sealed from other valve ports by O-rings 115, 116 received within grooves formed in second plunger portion 111 and positioned above and below recess 113. Second plunger portion 111 blends into the larger first plunger portion 110 by means of a flange or frusto-conical surface 118 which surface is adapted to engage shoulder 107 for preventing movement of second plunger 79 out of second chamber 73. Disposed directly below frusto-conical surface 118 and within a groove formed in first plunger portion 110 is an O-ring seal 119 which is operable, depending upon the position of second plunger 79 within second chamber 73, to prevent communication between first and second chambers 72, 73. The base or bottom of second plunger portion 111 may be viewed as a generally flat surface 120 from which a semicircular boss 121 depends. Depending from boss 121 at some predetermined distance from centerline 102 is an actuating lever 123. Lever 123 extends within the gap 86 between sliding portions 87, 91 of first plunger 76. When frusto-conical surface 118 of second plunger 79 contacts shoulder 107 as shown in FIG. 2, actuating lever 123 moves as an eccentric as shown in FIG. 5 into the opening 104 in shelf 101. Simultaneously, actuating lever 123 contacts sliding portion 87 to lock first sliding piston 83 into the position shown in FIG. 3.

As best shown in FIG. 5, cavity 99 is offset from the center of chamber 72. This permits lever 123 to drop below connecting rod 85 when the valve is in the position shown in FIG. 4. This permits the length of second plunger 79 to be shorter than what it otherwise might be to make the valve compact.

To effect manual movement, both rotary and axial, of second plunger 79 to establish various mode positions of valve 10, a stud 125 extending beyond the valve body may be provided as a part of the second plunger. An operating handle 126 as shown in FIG. 6 may thus be applied to stud 125 and an index dial 127 may be affixed to the valve body in any known manner. To provide positive stop for the valve to assure operator "feel" a suitable detent arrangement may be provided such as might easily suggest itself to those skilled in the art and not shown herein, although valves made in accordance with the structure disclosed herein have demonstrated no need for such detent arrangement.

In operation, control valve 10 is either manually or automatically operated to establish several different operating modes which are either necessary or desirable to tractor-trailer brake systems. These modes may be defined as "normal operation," "failsafe," "park," "fill" and "bobtail." Fluid communication paths between valve ports 60–63 in each of these valve modes may best be set forth in tabulated form as shown below:

TABLE I

| Operating Mode | 1st Port | 2nd Port | 3rd Port | 4th Port |
| --- | --- | --- | --- | --- |
| Normal Highway | Sealed | X | X | Sealed |
| Failsafe (Automatic) | Sealed | X | Sealed | X |
| Park | Sealed | X | Sealed | X |
| Fill | X | X | Sealed | Sealed |
| Bobtail (Manual Lock) | Sealed | X | Sealed | X |

"X" indicates fluid communication therebetween.

The normal operating highway mode occurs with the trailer coupled to the tractor and park valve 46 in a released position to thus supply air at supply pressure into third port 62. Air at supply pressure also exists in first port 60. Referring now to FIG. 2, the air pressure at third port 62 opposes first and second springs 96, 97 to compress same and move first plunger 76 into its second position whereby the second slider-piston thereof 84 prevents leakage to atmosphere through port 63 because sliding portion 91 is sealed by O-ring 93. Air then travels past first slider-piston 83 and acts against the base surface 120 (including boss 121) of second plunger 79 to move same upward in second chamber 73 until frusto-conical surface 118 contacts shoulder 107 to prevent further movement of the second plunger. Air then flows through flutes 108 into second port 61 and thence through line 31, etc. First port 60 is isolated by seals 115, 116.

Control valve 10 when in its normal operating mode automatically shifts to its failsafe mode if a loss of fluid pressure should occur in the trailer air system as, for example, if the trailer or towed vehicle should break away or if any other serious leak should develop. The occurrence of such leakage would drop the pressure entering third port 62. When this pressure drops below the force at which springs 96, 97 are compressed (and this value may be varied for different applications by appropriate spring rates) first slider-piston 83 will move to its first position to prevent any air from escaping through third port 62. Simultaneously, second slider-piston of the first plunger will automatically uncover the fourth vent port 63 thus venting supply line 31 through second port to atmosphere. Second plunger 79 will not drop downward in second chamber 73 because pressure isolated port 60 bears against seals 115, 116. Seals 115, 116 in turn press against second cavity 100 to not only maintain second plunger 79 in the position but also provide "feel" to the operator when manually shifting the valve. A particular advantage of this valve is that subsequent pressure buildup above the preselected spring force value will reverse the above sequence and re-establish normal highway operating mode. Thus the failsafe feature of valve 10 is also "foolproof."

Setting the trailer brakes for park position automatically occurs when park control valve 46 is moved to its applied position which opens lines 50, 51 to atmosphere. When the pressure in third port 62 reaches a predetermined value as it exhausts to atmosphere, springs 96, 97 force first slider-piston 83 of first plunger 76 to seal third port 62. Simultaneously, the second port is connected via flutes 108, second and first chambers 72, 73 to atmosphere through fourth port 63. This action sets the brakes of trailers which are in common use at this time, and satisfies federal requirements that setting of both tractor and trailer brakes be accomplished by one valve.

From the parked position thus described, the trailer air reservoir 41 can be pressurized prior to moving the rig and importantly without releasing spring-set brake actuators 25 on the tractor by simply pushing second plunger 79 downwardly from its position shown in FIG. 2 to its fill position shown in FIG. 4. That is, the second plunger is pushed downwardly until its base portion 120 contacts the top of shelf 101. In this position, O-ring 119 prevents first and second ports 60, 61 from communicating with second valve chamber 73 while permitting air at supply pressure in first port 60 to communicate through flow area 114 to second port 61. When it is desired to operate the rig in normal highway operation, movement of part control 46 to its released position supplies air at supply pressure to third port 62. This pressure forces the first plunger to move towards its second position and acts against base 120, 121 of the second plunger 79 to move same to its normal highway position as shown in FIG. 2. The second plunger 79 will move in this manner because the area at the base thereof is larger than the area of the second plunger portion 111 which is acted upon by air pressure from first port 60. In this connection, it should be noted that control valve 10 of the subject invention is foolproof in the sense that if the operator failed to actuate the valve in its fill mode and simply released park brake 46, the valve would revert to the position shown in FIG. 2 and the trailer reservoir 41 would be pressurized although the tractor spring-set brakes 25 would be simultaneously released. The control valve is also foolproof in the sense that if the rig was operating with valve 10 in normal mode and the operator attempted to place the valve in fill mode, it would simply pop back to normal mode. Finally upon either method of releasing the parked brakes, federal regulations are satisfied in that actuation of a single park control valve 46 accomplishes same.

Finally, the tractor brake system is completely protected by control valve 10 when the valve is placed in its bobtail operating mode position for operation of the tractor not coupled to a trailer. This is simply accomplished by rotating second plunger 79 one-half turn from its normal highway position shown in FIG. 2. As best shown in FIGS. 3 and 5, this rotation causes actuation lever 123 to be received within the relieved area of shelf 101. Simultaneously, the actuating lever 123 locks first plunger 76 into its first position to seal third port 62, vent second port 61 to atmosphere via fourth port 63 and isolate the first port 60 by seals 115, 116. With the valve in the bobtail position shown in FIG. 3, it should be noted that the bottom of boss 121 is seated against the top of shelf 101 to prevent O-ring 119 from dropping below flutes 108. Thus, it is impossible to prevent second port 61 from being vented to atmosphere. Additionally, because control valve 10 must be rotated into its bobtail mode, it is believed that the operator will become better aware of such valve position since most valves in such systems are push-pull applications. If desired, protrusions may be provided on second plunger 79 (not shown) to provide solid rotational stops. Furthermore, the failsafe and bobtail modes of the control valve 10 are functional equivalents of known tractor protector control valves. Thus, brake systems need not be equipped with such valves and an improved system which complies with federal regulations may be had at less cost.

The invention has thus been described with reference to a preferred embodiment, i.e., control valve 10 within a conventional tractor-trailer air system. Obviously, modifications and alterations will occur to others, upon reading and understanding the specification, It is my intention to include all such modifications and alterations insofar as they come within the scope of the present invention.

It is thus the essence of the invention to provide a control valve for use in pneumatic braking systems which incorporates a pressure sensitive first plunger in conjunction with a manually movable second plunger which operate in phased relationship with one another to permit the brake system to satisfactorily function in a wide variety of operating phase relationships.

Having thus defined the invention, I claim:

1. A control valve for use in a brake system comprising:

a valve body having a first chamber in a first portion thereof and a second chamber in a second portion thereof, said second chamber open at one end and in communication with said first chamber at its opposite end;

a first and second port in communication with said second chamber and a third and fourth port in communication with said first chamber;

a first pressure responsive plunger slidably disposed within said first chamber, first sealing means associated with said first plunger preventing fluid communication between said third port and said second chamber when said first plunger is in a first position and preventing communication between said fourth port and said second chamber when said plunger is in a second position; and a second plunger within said second chamber movable between a first and second position, second sealing means associated with said second plunger to isolate said first port from fluid communication with said second port and said first chamber and provide fluid communication between said second port and said first chamber when said second plunger is in a first position, third sealing means associated with said second plunger to prevent fluid communication between said first and second chambers and provide fluid communication between said first and second ports when said plunger is in said second position.

2. The control valve of claim 1 further including spring means associated with said first plunger normally biasing said first plunger to said first position; and pressure responsive means formed as part of said second plunger and operable to automatically move said second plunger from its second position to its first position when said bias of said spring means is neutralized.

3. The control valve of claim 2 wherein said second chamber is further defined by a first cavity adjacent said first chamber, and a second cavity adjacent said open end of said second chamber and contiguous with said first cavity, said first cavity greater in cross section than said second cavity;

said second plunger is further defined by a first portion similar in configuration to said first cavity and a second portion similar in configuration to said second portion, said first portion having a base surface adjacent said second chamber; and said pressure responsive means including said base surface, and an actuating lever associated therewith.

4. The control valve of claim 3 wherein said first plunger includes a first slider-piston adjacent said third port, a second slider-piston adjacent said fourth port and a member interconnecting said first and second slider-pistons and defining a gap therebetween, said actuating lever extending within said gap.

5. The control valve of claim 4 wherein each slider-piston includes a cylindrical slider portion adjacent said member and a cylindrical piston portion extending from said slider portion, said first slider portion sealingly slidably supported by a first seal in said first chamber when said first plunger is in its first position, said second slider portion sealingly and slidably supported in said first chamber by a second seal when said first plunger is in its second position; and said second slider portion having a groove formed adjacent said second piston portion to provide fluid communication between said fourth port and said second chamber when said first plunger is in its first position.

6. The control valve of claim 5 wherein an annular shoulder extending from said second chamber adjacent said second port defines a line of demarcation between said first and second cavities, said second plunger abutting said shoulder when said second plunger is in its second position; and said first cavity further having a plurality of circumferentially spaced flutes communicating with said second port, said flutes extending a predetermined axial distance within said first cavity to provide fluid communication between said first cavity and said second port when said second plunger is in its first position.

7. The control valve of claim 6 further including said first and second cavities, and said first and second portions of said second plunger being generally cylindrical in configuration; and eccentric means associated with said base surface operable when said second plunger in its first position is rotated to lock said first plunger in its first position.

8. The control valve of claim 7 wherein said cavity includes a shelf protruding therefrom adjacent said first chamber, said shelf recessed to define a central opening therein; and said eccentric means includes a boss depending from said base surface and extending on one side of the center of said first cavity and an actuating lever depending from said boss, said actuating lever received within said central opening and said boss resting on said shelf when said second plunger is rotated, said boss preventing rotation when said second plunger is in second position while permitting rotation when said second plunger is in its first position.

* * * * *